United States Patent
Abrisketa Lozano

(10) Patent No.: US 8,539,747 B2
(45) Date of Patent: Sep. 24, 2013

(54) SHACKLE CONNECTING DEVICE

(71) Applicant: Vicinay Cadenas, S.A., Bilbao (ES)

(72) Inventor: Nagore Abrisketa Lozano, Bilbao (ES)

(73) Assignee: Vicinay Cadenas, S.A., Bilbao (Vizcaya) (ES)

( * ) Notice: Subject to any disclaimer, the term of this patent is extended or adjusted under 35 U.S.C. 154(b) by 0 days.

(21) Appl. No.: 13/621,954

(22) Filed: Sep. 18, 2012

(65) Prior Publication Data

US 2013/0019582 A1    Jan. 24, 2013

Related U.S. Application Data

(63) Continuation of application No. PCT/ES2011/070109, filed on Feb. 22, 2011.

(30) Foreign Application Priority Data

Mar. 23, 2010   (ES) .................................. 201030421

(51) Int. Cl.
*F16G 15/06* (2006.01)
*B66C 1/34* (2006.01)

(52) U.S. Cl.
USPC ................ 59/86; 294/82.35; 294/82.1; 59/93

(58) Field of Classification Search
USPC ................... 59/85, 86, 93; 294/82.23, 82.35, 294/82.1
See application file for complete search history.

(56) References Cited

U.S. PATENT DOCUMENTS

| 575,032 | A | 1/1897 | Kimbrell | |
|---|---|---|---|---|
| RE34,046 | E | 9/1992 | Shahan | |
| 7,134,268 | B2 * | 11/2006 | Siappas | 59/86 |
| 7,448,823 | B2 * | 11/2008 | Silva | 59/86 |
| 7,540,140 | B1 * | 6/2009 | Diaz et al. | 59/86 |
| 7,614,209 | B1 | 11/2009 | Payne et al. | |
| 8,240,728 | B2 * | 8/2012 | Hwang et al. | 294/82.35 |
| 2005/0276658 | A1 | 12/2005 | Silva | |

FOREIGN PATENT DOCUMENTS

WO     2006/055581      5/2006

OTHER PUBLICATIONS

International Search Report issued Jul. 13, 2011 in International (PCT) Application No. PCT/ES2011/070109.

* cited by examiner

*Primary Examiner* — David B Jones
(74) *Attorney, Agent, or Firm* — Wenderoth, Lind & Ponack, L.L.P.

(57) ABSTRACT

The device, which is intended to connect a shackle (1) to the links (2) of a chain using a bolt (8), comprises two parts (3) and (4), part 3 being a cylindrical body that guides the insertion/extraction of the bolt (8). A lever (7), which is joined to the bolt (8), extends from the side of the cylindrical body (5) and can be displaced in order to move the bolt (8). Part 4 comprises a nut (9) screwed to the end of the bolt (8) in order to secure such bolt (8). The invention also includes a handle (10) that can be attached to the nut (9) to allow the bolt (8) to be tightened by a robot. Parts 3 and 4 include brackets (11) and (12) between which through-rods (13) are screw-mounted at the ends thereof in order to secure said parts (3) and (4) to one another.

4 Claims, 1 Drawing Sheet

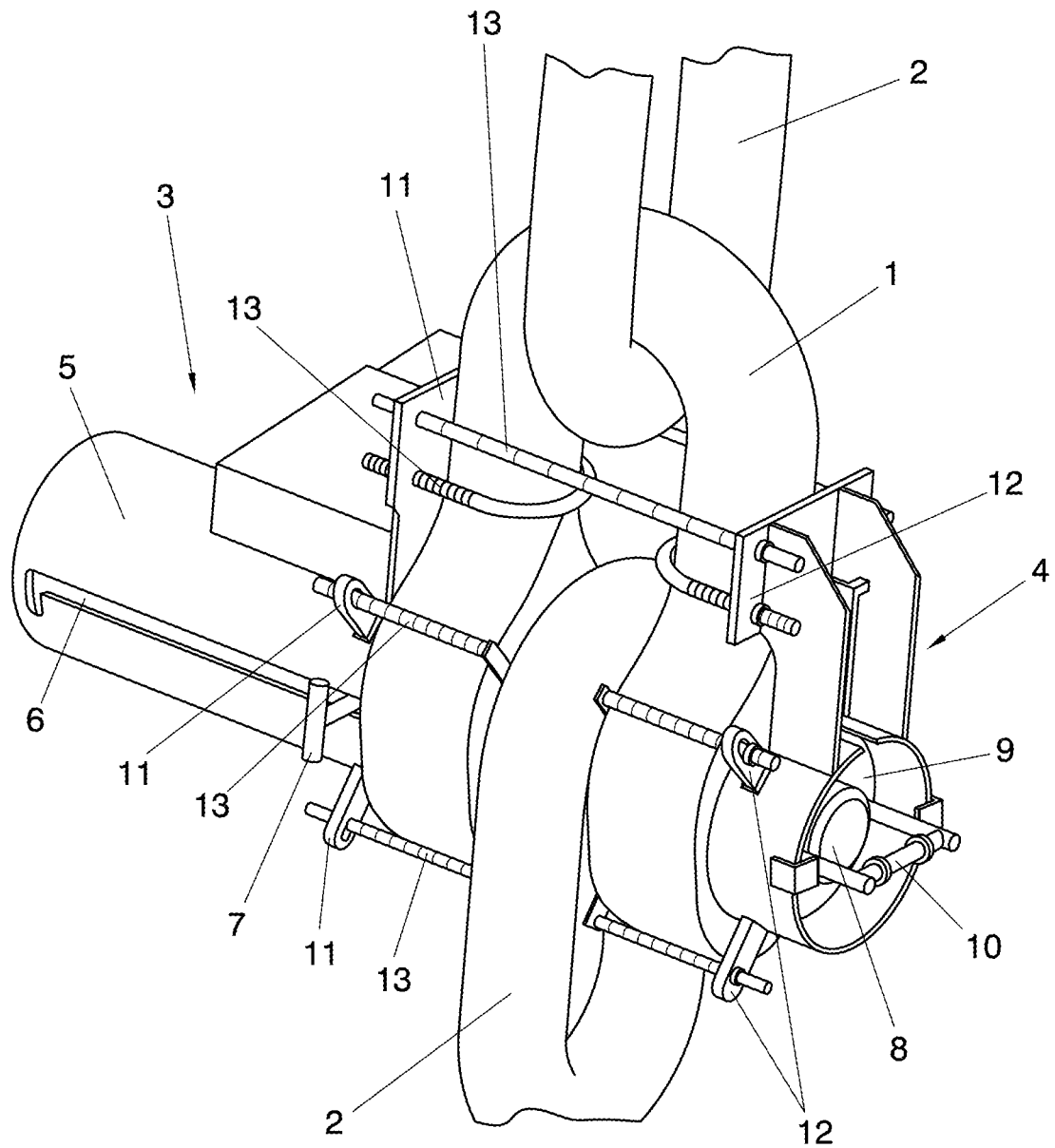

SHACKLE CONNECTING DEVICE

OBJECT OF THE INVENTION

The present invention, as expressed in the statement of this specification, relates to a shackle connecting device, which is intended to be used at that type of shackles that are used in the joint of links or other elements to a chain, resulting especially applicable in chains used in the marine sector for, for example, the immersion and/or extraction of equipment, machines, etc., into/from the sea.

The object of the invention is to provide a device for the applications previously referred to, with simple setting up and easy to perform the assembly between the parts involved in said assembly, for its connection to the corresponding link of a chain.

BACKGROUND OF THE INVENTION

As it is known, the chains used in the marine sector for funding or other applications, are large, and therefore very heavy and difficult to handle, so that these chains are complemented with assembly shackles, which operation is complicated due to the size and dimensions, with respect to assembly and subsequent joint of the shackles to the links of the chain.

Although said attachment/detachment activities or operations are usually performed on land, which is obviously more comfortable, they are also currently being carried out under the sea, using for these operations robots called ROV (Remotely Operated Vehicle) responsible for carrying out the connection of the shackles.

In this regard, the document relating to the patent US2005/041429 describes a shackle and a method for the exchange of it under the water, using a robot, including the shackle two bolted plates in one of its legs, with the particularity that in one of these plates, there is a guiding system for the shackle bolt.

On the other hand, the aforementioned shackle bolt, according to what is described in that US patent, has a specific shape in its end so that, through the use of a hydraulic claw, it is able to hook said bolt and remove it from the shackle, through the use of a robot.

Well then, the problems presented by the solution claimed and described in this US patent, can be summarized in the following:

- It is necessary that the shackle bolt end has a specific configuration so that it can be hooked via the hydraulic claw, which undoubtedly is already an increase in the cost for obtaining the bolt.
- Due to the specific shape of the end of the bolt, problems can occur in the alignment when removing said bolt.
- In the case of wanting to disassemble the plates of the shackle once assembled, it is very complicated to do, due to the type of mooring of said plates to the plate of the own shackle.
- Since the movement of the bolt is carried out by means of a hydraulic piston, it is necessary to provide a robot that supplies the necessary compression to the piston in order to carry out the assembly operation.
- As a consequence of requiring a higher pressure robot, the risk of damage increases.
- The shackle could be used on land, although the use of it would be tedious, since it would be necessary a pusher carrying out the sufficient force to push the piston.

DESCRIPTION OF THE INVENTION

The shackle connecting device object of the invention has a series of peculiarities and novelty features that allow solving the above problems.

In this sense, the device itself is based on a mountable and detachable kit which facilitates the connection of the shackles to a chain of links or other elements, the configuration and design of which facilitate said assembly task, either on land or under the water, being also applicable to any type of shackle either H-, D- or Y-shackle.

Basically the device of the invention comprises two parts related to each other, one of them determinant of a guiding means for the bolt, while that part is configured by a cylindrical and hollow body that guides the bolt in its movement of extraction and introduction in the shackle, said cylindrical body being affected by a side slot through which a lever attached to the bolt itself moves and through which is carried out the push by the robot for the installation and introduction of the bolt in the shackle. The lever is attached to the bolt through a pin or other suitable standard means.

The other part of the two comprising the device, relates to a mooring means of the bolt itself, and is based on a nut screwed on the end of the bolt, which nut is complemented for its actuation with a handle so that the robot can perform the threading, complementing the mooring with a pin that immobilizes the nut once tightened, preventing the unscrewing of said nut.

The two referred parts are equipped with brackets with holes for passage of rods with threaded ends, in which tightening nuts shall be fixed to join both parts to each other and the whole set is duly mounted on its connection to the link of a chain, so that in the case of wanting to release the shackle device it will be enough to cut said connecting rods.

Using the device described, the assembly and disassembly operations of the bolt corresponding to the shackle are facilitated, both on land and in the water, since the force to be used to move the bolt through the guiding system is minimum.

Also it is important to highlight that the device is compatible with any type of shackle as it has been previously mentioned, allowing the possibility of placing the components corresponding to the guiding parts of the bolt and to the mooring part of said bolt on different legs of the shackle, or on the same leg, being therefore adaptable to the needs of the client.

BRIEF DESCRIPTION OF THE DRAWINGS

To complement the description which will be carried out next and with the object of helping to a better understanding of the features of the invention, the present specification is accompanied by a set of drawings based on which the innovations and advantages of the shackle connecting device object of the invention will be more easily understood.

The only FIGURE plotted in the drawings sheet shows a general perspective view of the device in operative arrangement, i.e. linking together a shackle to the links of a chain.

DESCRIPTION OF THE PREFERRED EMBODIMENT

As it can be seen in the aforementioned figures, the device of the invention, applicable to the connection of the bridge 1 of a shackle to the links 2 of a chain, is constituted by two parts 3 and 4, the first of them as guiding means for the corresponding bolt 8, and the second as a mooring means of said bolt 8, and such bolt 8 is intended, as it is evident, for passing through the holes established on the bridge 1 of the shackle and constituting the connection of said bolt 8 with the corresponding link 2 of the chain.

The part 3 consists of a cylindrical and hollow body 5 wherein the own bolt 8 is guided in its introduction and/or extraction, which cylindrical body 5 is affected by a lengthwise side slot 6, through which emerges and is movable a lever 7 attached to the bolt itself 8 by a pin.

The part 4 corresponding to the mooring of the end of the bolt 8, comprises a nut 9 which is fixed by screwing on the end of the bolt 8, such that a handle 10 which is logically connected to the nut 9 is used so that the robot can perform the screwing for the actuation in the screwing and unscrewing of said nut 9 by a robot.

The nut 9 is fastened once the tightening has been carried out, through a cross pin that immobilizes said nut 9, preventing it from becoming loose or unscrewed with respect to the end of the bolt 8 on which it is threaded.

Both, part 3 wherein the guiding means for the bolt 8 is established, and part 4 wherein the nut 9 for clamping to said bolt 8 is positioned, have brackets 11 and 12, respectively, for joining together both parts 3 and 4 through threaded rods 13, passing through holes established in the two sets of brackets 11 and 12 of one and another part 3 and 4, for carrying out the tightening by using the corresponding nuts and establishing the joint or fixation to each other of said parts 3 and 4 and therefore of the device assembly in its mounting on the shackle 1 and its connection to the corresponding link 2 of a chain.

The invention claimed is:

1. A shackle connecting device, for use in the connecting of a shackle, which includes a bridge, to a chain of links,
    wherein a joint between the shackle (1) and a link (2) of the chain is via a cross bolt (8), and comprises
    first and second parts (3, 4) related to each other in a mountable and removable manner,
    wherein the first part (3) constitutes a guiding part for guiding the bolt (8),
    wherein said bolt (8) is arranged for coupling between the link (2) of the chain and the bridge (1) of the shackle,
    wherein the second part (4) constitutes a mooring part arranged to moor the bolt (8),
    wherein the first part (3) is constituted by a cylindrical and hollow body (5), with a longitudinal side slot (6),
    wherein a lever (7) is fixed to the bolt (8), emerges from the longitudinal side slot (6), and is movable.

2. The shackle connecting device, according to claim 1, wherein the second part (4), comprises a nut (9) threaded on the end of the bolt (8).

3. The shackle connecting device, according to claim 1, wherein the second part (4) and the cylindrical body (5) of the first part (3), have brackets (12, 11) with holes for passage of rods (13), said rods (13) having nuts for fixing the first and second parts (3, 4) to each other.

4. The shackle connecting device, according to claim 2, wherein the second part (4) and the cylindrical body (5) of the first part (3), have brackets (12, 11) with holes for the passage of rods (13), said rods (13) having nuts for fixing the first and second parts (3, 4) to each other.

* * * * *